United States Patent Office 3,840,562
Patented Oct. 8, 1974

3,840,562
3-AMINO LOWER ALKYL-1-PHENYLISOCHROMANS AND THEIR PREPARATION
James W. Bolger, Canoga Park, Calif., and Francis J. Petracek, Bloomington, Minn., assignors to Riker Laboratories, Inc., Northridge, Calif.
No Drawing. Filed Aug. 25, 1971, Ser. No. 174,994
Int. Cl. C07d 7/18
U.S. Cl. 260—345.2        7 Claims

ABSTRACT OF THE DISCLOSURE

A process for the preparation of 3-amino-lower alkyl-1 - phenylisochromans comprising the treatment of an ω-chloro - 1,2-epoxy-lower alkane with a phenyl Grignard reagent to form an α-(ω-chloro-lower alkyl) - 2 - phenethyl alcohol, which is cyclized to form the corresponding 3 - (ω-chloro-lower alkyl) - 1 - phenylisochroman, which is then directly aminated to the corresponding 3-amino-lower alkyl - 1 - phenylisochroman final product.

BACKGROUND OF THE INVENTION

This invention relates to chemical processes, and more particularly to processes for the preparation of 3-amino-lower alkyl - 1 - phenylisochromans and to certain intermediates obtained in said processes.

1-Phenylisochroman is known, as are derivatives of isochroman, for example as shown in U.S. Pat. 2,701,254 which describes derivatives of isochroman in which cyano, carbamoyl or carboxy substituents are present on the benzene ring thereof. Flavones and flavanoid compounds are known in which a chroman or chromone ring structure is present, flavone as such being 2-phenylchromone. U.S. Pats. 3,410,851 and 3,450,717 disclose numerous derivatives of flavone. Derivatives of chroman are also shown in U.S. Pat. 3,103,515. See, also, Colonge et al., Compt. Rend. 239, 1047–9 (1954); and Rieche et al., Ber. 89, 1254–62 (1956). However, the compounds of the prior art are believed to be significantly different from those of the present invention, and so far as is known to applicants, 3-chloroalkyl - 1 - phenylisochroman and other derivatives of 1-phenylisochroman of the type disclosed herein have not been heretofore described. Likewise, it is believed that the process disclosed and claimed herein for preparation of 3-amino-lower alkyl-1-phenylisochromans has not been disclosed heretofore.

Broadly speaking, the process of the invention comprises treating an ω-chloro-1,2-epoxy-lower alkane having from 3 to 9 carbon atoms (and which may be substituted by a lower alkyl group on the α-carbon atom) with a selected phenyl Grignard reagent to form an α-(ω-chloro-lower alkyl) - 2 - phenethyl alcohol, cyclizing and further phenylating said α-(ω-chloro-lower alkyl)-phenethyl alcohol to form a 3-(ω-chloro-lower alkyl)-1-phenylisochroman; and directly aminating said 3-(ω-chloro-lower alkyl)-1-phenylisochroman to give the desired 3-amino-lower alkyl-1-phenylisochroman final product.

The novel intermediate compositions produced in the processes which are claimed herein have the structure represented by the formula

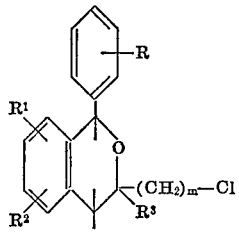

wherein $m$ is an integer from 1 to 4, and the alkylene chain may contain a substituent methyl group; R is hydrogen, lower alkyl, halogen, trifluoromethyl, amino, N-lower alkylamino or N,N-dilower alkylamino; $R^1$ and $R^2$ are each hydrogen, lower alkyl, halogen, trifluoromethyl, hydroxy or lower alkoxy; and $R^3$ is hydrogen or lower alkyl.

As used throughout the application, the terms "lower alkyl" and "lower alkoxy" include both straight and branched chain alkyl and alkoxy radicals, respectively, containing from 1 to 6 carbon atoms, for example, but without limitation, alkyl chains such as methyl, ethyl, n-propyl, isopropyl, n-butyl, tertbutyl, n-amyl, sec-amyl, n-hexyl, 2-ethylbutyl, 2,3-dimethylbutyl and the like. Illustrative heterocyclic ring systems which are formed by amination as set forth hereinbelow include pyrrolidino, piperidino, morpholino, piperazino, N-lower alkylpiperazino, N-phenylpiperazino and the like. The term "halogen" includes chlorine and fluorine.

In the specification, the term "amino-lower alkyl" (as in the generic name "3-amino-lower alkyl-1-phenylisochroman") is to be understood as including amino-, amino-lower alkyl, lower alkylamino-lower alkyl, di-lower alkylamino-lower alkyl and nitrogen-containing monoheterocyclic-lower alkyl.

The claimed compounds are valuable chemical intermediates in the preparation of 1-phenyl-3-substituted aminoalkylisochroman compounds which have significant pharmacological activity as anorectic agents, or have physiological activity on the mammalian central nervous system, as shown in copending application Ser. No. 174,-992, filed Aug. 25, 1971, now U.S. Pat. 3,743,659, as a continuation-in-part of application Ser. No. 855,457, filed Aug. 25, 1969, now abandoned.

The following reaction sequence is illustrative of the process. In the formulae, $m$, R, $R^1$, $R^2$ and $R^3$ have the same significance as set forth hereinabove. $R^4$ and $R^5$ represent hydrogen, lower alkyl or lower hydroxyalkyl, or, when taken together with the nitrogen atom to which they are attached, form a saturated 5 or 6 membered nitrogen-containing ring having 3 to 5 carbon atoms, one of which may be replaced by oxygen.

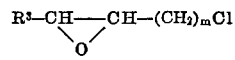

STARTING MATERIAL

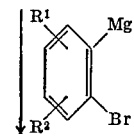

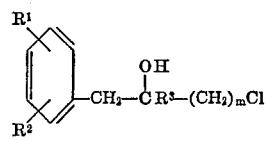

INTERMEDIATE

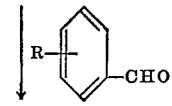

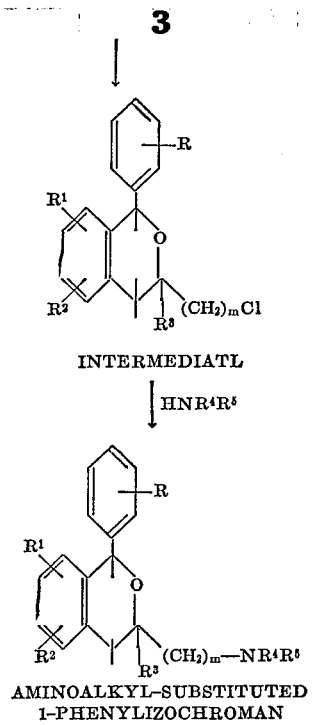

INTERMEDIATE

AMINOALKYL-SUBSTITUTED
1-PHENYLIZOCHROMAN

The starting materials used in the process according to the present invention are 1,2-epoxy-ω-chloro-lower alkanes of the formula

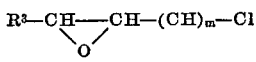

wherein $R^3$ is hydrogen or lower alkyl and $m$ is an integer from 1 to 6. Among such starting materials which are readily available in commerce are:

1-chloro-2,3-epoxypropane,
1-chloro-2,3-epoxybutane,
4-chloro-1,2-epoxybutane, and
5-chloro-1,2-epoxypentane.

Others, such as 10-chloro-4,5-epoxydecane and 15-chloro-7,8-pentadecane, are obtained by treating an olefinic hydrocarbon having the desired number of carbon atoms with epoxidizing agents, e.g. hydrogen peroxide. Each of the starting materials is fully equivalent to the specific starting materials disclosed in the examples, and the use of each is considered to be within the scope of the present invention and is illustrative of the other epoxy group-containing alkanes included in the above formula.

According to the reaction sequence depicted above, the 1,2-epoxy-ω-chloro-lower alkane is phenylated by treatment with a phenyl Grignard reagent to form an α-(ω-chloro-lower alkyl)-2-phenethyl alcohol intermediate. The Grignard reagent may be formed *in situ* in the reaction medium by the use of bromobenzene or a mono- or di-substituted derivative in the presence of magnesium. Illustrative of the bromobenzene derivatives that may be used in this manner are:

| | |
|---|---|
| bromobenzene, | 4-bromofluorobenzene, |
| 2-bromobenzotrifluoride, | 2-bromo-4-methylphenol, |
| 3-bromobenzotrifluoride, | o-bromophenol, |
| 4-bromobenzotrifluoride, | m-bromophenol, |
| 2-bromochlorobenzene, | p-bromophenol, |
| 3-bromochlorobenzene, | 4-bromoresorcinol, |
| 4-bromochlorobenzene, | 2-bromotoluene, |
| 4-bromo-6-chloro-o-cresol, | 4-bromotoluene, |
| o-bromoethylbenzene, | 2-bromo-m-xylene, |
| p-bromoethylbenzene, | 3-bromo-o-xylene, |
| 2-bromofluorobenzene, | 4-bromo-o-xylene and |
| 3-bromofluorobenzene, | 4-bromo-m-xylene. |

Iodobenzene derivatives, although less readily available, would be useful as replacements for the bromo derivatives in the process. The use of any one of these materials in the *in situ* preparation of the Grignard reagent, or of any of the other substituted benzenes included within the scope of the formula therefor set forth in the above reaction sequence, is fully equivalent to the use of specific materials disclosed in the examples and is included within the scope of the present invention.

Alternatively, commercially available Grignard reagents can be used in the practice of the invention if desired.

The reaction is conveniently carried out in the presence of an inert organic solvent, i.e. a solvent inert to the components of the reaction mixture, such as, for example, tetrahydrofuran, ether, dioxane and the like, and at a temperature in the range of from about 0° to around 100° C.

The α-(ω-chloro-lower alkyl)-2-phenethyl alcohol thus formed is then further phenylated and cyclized to form the corresponding 3-(ω-chloro-lower alkyl)-1-phenylisochroman. The reaction is achieved through treatment of the alcohol with a benzaldehyde having the selected R substituent, preferably in excess, in the presence of a Lewis acid catalyst such as, for example, aluminum chloride, zinc chloride and the like, and in the presence of gaseous hydrogen chloride, at a temperature in the range of about 0° to 100° C. While no solvent is ordinarily required, methanol or other lower alkanol may be used if desired.

The 3-(ω-chloro-lower alkyl)-1-phenylisochroman thus formed can then be directly aminated by treatment with ammonia, a primary amine, a secondary amine or a saturated heterocyclic base in the presence of an inert organic solvent such as, for example, ethanol, tetrahydrofuran, benzene and the like, and at a temperature of from 50° to 200° C. The 3-amino-lower alkyl-1-phenyl-isochroman final product is recovered by conventional techniques of isolation and purification.

The 3-amino-lower alkyl-1-phenylisochromans wherein the amino group is unsubstituted, prepared by either of the above-described sequences, are readily converted to equivalent 3-(N,N-di-lower alkylamino-lower alkyl)-1-phenylisochromans by means of reductive alkylation through treatment with an appropriate aldehyde or ketone in the presence of an inert solvent and with the aid of a catalyst such as palladium over carbon Where straight chain lower alkyl substitution on the amino nitrogen atom is desired, a straight chain aldehyde is employed, for example methyl substituents result from the use of formaldehyde, ethyl from acetaldehyde, propyl from propionaldehyde, n-butyl from n-butyraldehyde. Where branched chain lower alkyl substitution is desired, with attachment to the nitrogen atom through a carbon atom remote from the point of branching by one or more carbon atoms, a branched chain aldehyde is employed, for example, iso-butyl (—CH$_2$CH(CH$_3$)$_2$) substituents result from the use of isobutyraldehyde, iso-amyl (—CH$_2$CH$_2$CH(CH$_3$)$_2$) is obtained by use of isovaleraldehyde; and where branched chain lower alkyl substitution is desired, with attachment to the nitrogen atom through the carbon atom forming the point of branching, a ketone is employed, for example, iso-propyl substituents result from the use of acetone, sec-butyl (—C(CH$_3$)CH$_2$CH$_3$) from ethylmethyl ketone, sec-amyl (—CH(CH$_2$CH$_3$)$_2$) from diethyl ketone.

Where the desired compound is an N,N-dimethyl-1-phenyl-3-isochroman lower alkylamine, the preferred method of converting the unsubstituted amino radical is through use of the well-known Leuckart reaction.

In accordance with one procedure, 3-(N-lower alkylamino-lower alkyl)-1-phenylisochromans are formed by conversion of the free amine first to the 1-phenyl-3-isochroman-lower alkylamine; (e.g. 1-phenyl-3-isochroman-lower ethylamide) by treatment with an appropriate acid-anhydride reagent. The chain length of the mono-lower alkyl substituent in the final product is dependent upon the nature of the anhydride reagent [J. Org. Chem. 23:728 (1958)] used to prepare the mono-alkyl substituent, acetic anhydride yielding the mono-ethyl, n-propionic acid anhydride yielding the mono-n-propyl, etc. The amide thus formed is then reduced with a hydride-type reducing agent such as lithium aluminum hydride to yield the final product wherein the amine function is mono-substituted with a lower alkyl radical. In accordance with an alternate procedure, primary 3-amino-lower alkyl-1-phenylisochroman is treated with a lower alkyl ester, for example ethyl, of a chlorocarboxylic acid followed by reduction of the resulting intermediate with lithium aluminum hydride. Where an N-methylamino radical is to be prepared, a chloroformate ester is used. The products of the reactions are recovered by conventional techniques of isolation and purification.

Among the primary and secondary amines and saturated heterocyclic bases that may be used in carrying out the reaction sequence comprising the invention are:

n-butylamine,
sec-butylamine,
tert-butylamine,
di-n-butylamine,
diethylamine,
di-n-hexylamine,
diisobutylamine,
diisopropylamine,
dimethylamine,
dipropylamine,
ethylamine,
isoamylamine,
isobutylamine,
isopropylamine,
methylamine,
propylamine,
benzylamine,
phenethylamine,
benzylmethylamine,
dibenzylamine,
N-phenylbenzylamine,
4-phenylbutylamine,
cyclopropylamine,
cyclobutylamine,
cyclopentylamine,
cyclohexylamine,
cycloheptylamine,
cyclooctylamine,
N-methylcyclobutylamine,
N-methylcyclopentylamine,
N-methylcyclohexylamine,
N-methylcycloheptylamine,
N-methylcyclooctylamine,
N-ethylcyclopentylamine,
N-ethylcyclohexylamine,
N-propylcyclohexylamine,
N-n-butylcyclopentylamine,
N-n-butylcyclohexylamine,
N-n-butylcyclooctylamine,
N-amylcyclohexylamine,
N-hexylcyclohexylamine,
N-heptylcyclohexylamine,
N-octylcyclohexylamine,
N-isopropylcyclohexylamine,
N-isopropylcyclooctylamine,
N-tert-butylcyclohexylamine,
N-tert-butylcyclooctylamine,
N-isobutylcyclopentylamine,
N-isobutylcyclohexylamine,
N-isobutylcyclooctylamine,
N-sec-butylcyclohexylamine,
N-sec-butylcyclooctylamine,
N-isohexylcyclohexylamine,
pyrrolidine,
piperidine,
piperazine and
morpholine.

The saturated heterocyclic bases used in the process according to this invention may, if desired, bear one or more lower alkyl substituents. Among the lower alkyl-substituted saturated heterocyclic bases that may be used in the practice of this invention are:

1-methylpyrrolidine,
2-methylpyrrolidine,
3-methylpyrrolidine,
1-ethylpyrrolidine,
2-ethylpyrrolidine,
1-n-propylpyrrolidine,
2-n-propylpyrrolidine,
1-n-butylpyrrolidine,
1,2-dimethylpyrrolidine,
1,3-dimethylpyrrolidine,
2,4-dimethylpyrrolidine,
2,5-dimethylpyrrolidine,
3,3-dimethylpyrrolidine,
3,4-dimethylpyrrolidine,
1,3-diethylpyrrolidine,
2,4-diethylpyrrolidine,
2,5-diethylpyrrolidine,
1-ethyl-2-methylpyrrolidine,
2-ethyl-1-methylpyrrolidine,
2-ethyl-2-methylpyrrolidine,
2-ethyl-4-methylpyrrolidine,
2-ethyl-5-methylpyrrolidine,
3-ethyl-1-methylpyrrolidine,
4-ethyl-2-methylpyrrolidine,
1-methyl-2-propylpyrrolidine,
2-methyl-1-propylpyrrolidine,
2-methyl-5-propylpyrrolidine,
3-methyl-1-propylpyrrolidine,
3-methyl-2-propylpyrrolidine,
4-methyl-2-propylpyrrolidine,
2-butyl-1-methylpyrrolidine,
1-butyl-3-methylpyrrolidine,
2-butyl-4-methylpyrrolidine,
1-tert-butyl-2-methylpyrrolidine,
3-sec-butyl-1-methylpyrrolidine,
1,2,4-trimethylpyrrolidine,
1-methylpiperidine,
2-methylpiperidine,
3-methylpiperidine,
4-methylpiperidine,
1-ethylpiperidine,
2-ethylpiperidine,
4-ethylpiperidine,
1-n-propylpiperidine,
2-n-propylpiperidine,
1-isopropylpiperidine,
1-(1-ethylbutyl)piperidine,
1-(2-ethylbutyl)piperidine,
1,2-diethylpiperidine,
1,4-diethylpiperidine,
4,4-diethylpiperidine,
1,2-dimethylpiperidine,
1,3-dimethylpiperidine,
1,4-dimethylpiperidine,
2,2-dimethylpiperidine,
3,3-dimethylpiperidine,
4,4-dimethylpiperidine,
4-isopropyl-1-methylpiperidine,
2-isopropyl-1-n-propylpiperidine,
1-methylpiperazine,
2-methylpiperazine,
1-ethylpiperazine,
2-ethylpiperazine,
1-n-propylpiperazine,
2-n-propylpiperazine, 1,3-dimethylpiperazine,
1,4-dimethylpiperazine,
2,3-dimethylpiperazine,
2,5-dimethylpiperazine,
1,4-diethylpiperazine,
2,5-diethylpiperazine,
2,5-diisobutylpiperazine,
1,4-diisopropylpiperazine,
2,5-diisopropylpiperazine,
1-ethyl-2-methylpiperazine,
1-ethyl-4-methylpiperazine,
2-ethyl-1-methylpiperazine,
2-ethyl-5-methylpiperazine,
2-ethyl-6-methylpiperazine,
1,2,4-trimethylpiperazine,
1,2,6-trimethylpiperazine,
1,3,5-trimethylpiperazine,
2,2,3-trimethylpiperazine,
2,2,6-trimethylpiperazine,
2,3,5-trimethylpiperazine,
4-methylmorpholine,
4-ethylmorpholine,
2-n-propylmorpholine,
4-n-propylmorpholine,
4-isobutylmorpholine,
4-isopentylmorpholine,
2-isopropylmorpholine,
4-isopropylmorpholine,
2,3-dimethylmorpholine,
2,4-dimethylmorpholine,
2,5-dimethylmorpholine,
2,6-dimethylmorpholine,
3,5-dimethylmorpholine,
4-ethyl-2,6-dimethylmorpholine,
5-ethyl-2,3-dimethylmorpholine,
4-isobutyl-2,6-dimethylmorpholine and
4-isopropyl-2,6-dimethylmorpholine.

The use of any one of these primary or secondary amines, or saturated heterocyclic bases is fully equivalent to the use of the specific amines used in the examples and is included within the scope of the present invention.

Illustrative specific (but not limiting) examples of the best mode contemplated by the inventors for carrying out the process invention are as follows:

EXAMPLE 1

(a) 2-(Chloromethyl) phenethyl alcohol

To 84 ml. (0.25 mole, 3M solution) of ethereal phenyl magnesium bromide is added with stirring 30 ml. of p-dioxane. To the resulting pasty mixture is then slowly added a solution of 47 g. (0.5 mole) of epichlorohydrin in 45 ml. of anhydrous diethyl ether to maintain a condition of gentle reflux. The reaction is carried out under nitrogen atmosphere with ice bath cooling available if necessary for controlling the rate of reflux. After refluxing for 18 hours, the reaction complex is decomposed by addition of 170 ml. of 3N sulfuric acid. The organic layer is washed successively with water, dilute aqueous sodium carbonate and water, dried over anhydrous magnesium sulfate and the solvent removed *in vacuo*. Distillation gives the product, b.p. 86–130° C./3.1–3.4 mm.

(b) 3-Chloromethyl-1-phenylisochroman

A mixture of 1-(chloromethyl) phenethyl alcohol (17.05 g., 0.1 mole), benzaldehyde (21.2 g., 0.2 mole) and anhydrous zinc chloride (94 g.) is saturated with gaseous hydrogen chloride (temperature climbed to —40° C.). The bubbling with stirring is continued for five hours while heating in an oil bath at 60–65° C. The cooled reaction mixture is poured into 250 ml. of ice water and extracted with two portions of ether. The combined ether extracts are washed with dilute aqueous sodium carbonate and then with water, dried over anhydrous magnesium sulfate and the solvent is removed *in vacuo*. Distillation gives the product, b.p. 175–181° C./2.3 mm., which crystallizes on cooling.

(c) 3-Aminomethyl-1-phenylisochroman hydrochloride

A steel bomb is charged with *cis*-3-chloromethyl-1-phenylisochroman (4.0 g., 0.0154 mole), liquid ammonia (20 ml.) and 25 ml. of absolute ethanol. The mixture is then heated at 100° C. for one hour. The reaction mixture is pulled down to an oil, taken up in 10 percent aqueous sodium hydroxide and covered with ether. The organic extract is washed with water, dried over anhydrous magnesium sulfate and bubbled with hydrogen chloride to give the product.

EXAMPLE 2

(a) 3-Chloro-2-methyl-1,2-epoxybutane

Methallyl chloride is heated with excess peracetic and sodium acetate in acetic acid at 40° C. for two hours. The product is obtained by petroleum ether extraction in nearly quantitative yield as determined by gas chromatography.

(b) 1-Chloro-2-methyl-3-phenyl-2-propanol

The 3-chloro-2-methyl-1,2-epoxybutane is added to an equimolar amount of phenyl Grignard in dioxane/ether. After three hours at 0° to 25° C. the mixture is treated with excess 3N sulfuric acid, washed with water, dried and the organic layer evaporated, affording an oil which after fractional distillation yields a colorless oil, b.p. 110–115° C. at 2.0 mm.

(c) 3-Chloromethyl-3-methyl-1-phenylisochroman

The 1-chloro-2-methyl-3-phenyl-2-propanol is condensed with benzaldehyde as described in Example 1(b) to yield an oil which upon distillation or column chromatography affords 50 percent crystalline product, m.p. 83–84.5° C., pure *cis* isomer.

(d) *cis*-3-Aminomethyl-3-methyl-1-phenylisochroman fumarate

3-Chloromethyl-3-methyl-1-phenylisochroman is converted to the corresponding amine by heating in a bomb with ammonia in ethanol for five days at 250° C. The oily free base is treated with fumaric acid in diethyl ether to yield, upon recrystallization from acetone/ether, the crystalline pure *cis* isomer, m.p. 141–143° C.

*Analysis.*—Calculated for $C_{21}H_{23}NO_5$ (MW 369.42): C, 68.28; H, 6.27; N, 3.79. Found: C, 68.46; H, 6.63; N, 3.90.

EXAMPLE 3

(a) 3-Chloromethyl-6-fluoro-1-phenylisochroman, m.p. 88–91° C.

(b) 3-Aminomethyl-6-fluoro-1-phenyl-3-isochroman hydrochloride, m.p. 208–210° C.

*Analysis.*—Calculated for $C_{16}H_{17}NOClF$: C, 65.42; H, 5.83; N, 4.77. Found: C, 65.21; H, 5.71; N, 4.76.

EXAMPLE 4

*cis*-3-(1-Piperidylmethyl)-phenylisochroman hydrochloride, m.p. 226.5–228° C.

EXAMPLE 5

*cis*-1-Phenyl-3-pyrrolidylmethylisochroman hydrochloride, m.p. 217–219° C.

EXAMPLE 6

3-(N-Propylaminomethyl)-1-phenylisochroman hydrochloride, m.p. 145–147° C.

EXAMPLE 7

3-(N-Isopropylaminomethyl)-1-phenylisochroman hydrochloride, m.p. 142–217° C.

EXAMPLE 8 cis-3-(N-Isobutylaminomethyl)-1-phenylisochroman hydrochloride, m.p. 142° C.

EXAMPLE 9

(a) cis-3-Chloromethyl-1-phenylchroman

1 - (Chloromethyl)-2-phenethyl alcohol (501 g., 2.94 mole) 624 g. ((5.88 mole) of benzaldehyde and 136 g. of anhydrous zinc chloride are mixed together then saturated with hydrogen chloride gas while being stirred. The gas is bubbled through the mixture for six hours while being heated at 60–65° C. The reaction is then poured into 2 liters of ice water. The oily product is extracted into ether, washed with water, dilute sodium carbonate and water and dried over magnesium sulfate. The excess ether is removed, and the benzaldehyde distilled off in vacuo. The residue is dissolved in 1.7 liters of hexane and chilled overnight. The resulting dark precipitate is dissolved in methylene chloride and decolorized with decolorizing charcoal. Removal of the methylene chloride leaves an oil which solidifies upon cooling. The solid is washed with petroleum ether (30–60° C.) to provide a product 91 percent cis and 9 percent trans. The product is dissolved in benzene and passed through a column containing 1500 g. of powdered magnesium silicate. Removal of the benzene leaves 180 g. of 100 percent cis product.

(b) cis-3-Aminomethyl-1-phenylisochroman hydrochloride, m.p. 211–214° C.

EXAMPLE 10

(a) cis-3-Aminomethyl-N-ethyl-1-phenylisochroman hydrochloride, m.p. 229–236° C.

(b) trans-3-Aminomethyl-N-ethyl-1-phenylisochroman hydrochloride, m.p. 229–236° C.

EXAMPLE 11

(a) 1-Chloro-3-(4-fluorophenyl)-2-propanol

This intermediate is prepared according to the method of Example 1(a), b.p. 91–123° C./325–800 microns.

(b) cis-3-Chloromethyl-7-fluoro-1-phenylisochroman

This intermediate is prepared according to the method of Example 1(b). Isolation by fractional distillation gives the desired product, b.p. 190–210° C./200–300 microns, greater than 98 percent cis according to nuclear magnetic resonance analysis.

(c) cis-7-Fluoro-3-aminomethyl-1-phenylisochroman hydrochloride

A 2-gallon 5.5 autoclave is charged with cis-3-chloromethyl-7-fluoro-1-phenylisochroman (350 g., 1.26 moles), anhydrous liquid ammonia (1400 ml.) and 3.2 liters of absolute ethanol. The mixture is then stirred at 150° C. for 16 hours.

The reaction mixture is evaporated under vacuum to an oil, taken up in 10 percent aqueous sodium hydroxide and extracted with diethyl ether. The organic extract is washed with water, dried over anhydrous magnesium sulfate and treated with hydrogen chloride gas to give the product. The product is recrystallized from ethanol-diethyl ether (1:1), m.p. 227.5–228° C.

(d) trans-3-Chloromethyl-7-fluoro-1-phenylisochroman

This intermediate is obtained by fractional crystallization from hexane from the lower boiling cis isomer and has a m.p. 83–84° C. The trans structure is established by nuclear magnetic resonance analysis.

(e) trans-7-Fluoro-3-aminomethyl-1-phenylisochroman hydrochloride

This compound is prepared from the intermediate of (d) by the method of (c), m.p. 194–195° C. The structure is confirmed by nuclear magnetic resonance spectral analysis and elemental analysis.

Analysis.—Calculated for $C_{16}H_{16}FNO \cdot HCl$: C, 65.4; H, 5.83. Found: C, 65.4; H, 5.96.

The compounds of Examples 3 through 8, 9(b) and 10 are prepared according to the method of the invention as described more specifically in Examples 1, 2, 9(a) and 11.

While the specification, including the specific examples hereof, has described the process and intermediate compounds in terms of ω-chloro-lower alkyl substituents, it is to be understood that 1,2-epoxy-ω-bromo-lower alkanes can be employed as starting materials so as to furnish 3-(ω-bromo-lower alkyl)-1-phenylisochromans, which compounds are fully equivalent to the ω-chloro-derivatives with respect to reacting with ammonia or primary or secondary amines as described herein.

What is claimed is:

1. A 1-phenylisochroman compound of the formula

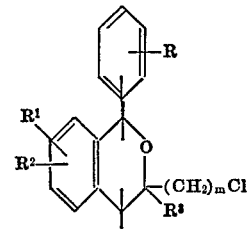

wherein m is an integer from 1 to 4, and the alkylene chain may contain a substituent methyl group; R is hydrogen, lower alkyl, halogen, trifluoromethyl, amino, N-lower alkylamino or N,N-di-lower alkylamino; $R^1$ and $R^2$ are each hydrogen, lower alkyl, halogen, trifluoromethyl, hydroxy or lower alkoxy; and $R_3$ is hydrogen or lower alkyl.

2. 3-(ω-Chloro-lower alkyl) - 1 - phenylisochroman according to claim 1.

3. 3-Choromethyl-1-phenylisochroman according to claim 1.

4. 3 - Chloromethyl - 7-fluoro-1-phenylisochroman according to claim 1.

5. 3 - Chloromethyl-6 - fluoro-1-phenylisochroman according to claim 1.

6. Process which comprises reacting an epoxy-α-chloro-lower alkane with phenyl Grignard reagent, preferably in the presence of an inert organic solvent, at a temperature in the range of 0° to 100° C. to produce an α-(ω-chloro-lower alkyl)-2-phenethyl alcohol, treating said substituted -2-phenethyl alcohol with a benzaldehyde in the presence of gaseous hydrogen chloride and Lewis acid catalyst at a temperature in the range of about 0° to 100° C., to form the corresponding 3-(ω-chloro-lower alkyl)-1-phenylisochroman; and reacting the 3-(ω-chloro-lower alkyl)-1-phenylisochroman with ammonia or a primary or secondary amine having from 1 to 12 carbons, in inert organic solvent solution, at a temperature in the range of about 50 to 200° C. to form a 3-amine-lower alkyl-1-phenylisochroman.

7. In the process according to claim 6, the step which comprises reacting 3-(ω-chloro-lower-alkyl)-1-phenyl-isochroman with a compound having the formula

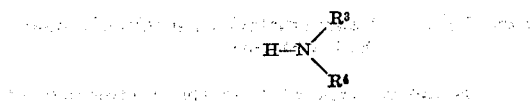

wherein $R^3$ and $R^4$ are independently hydrogen, lower alkyl or hydroxy-lower alkyl, or, when taken together with the nitrogen atom to which they are attached, form a 5 or 6 membered nitrogen-containing ring having 3 to 5 carbon atoms in the ring, one of which may be replaced by oxygen.

References Cited

UNITED STATES PATENTS 3,410,851  11/1968  Stauffer _____ 260—345.2 X

OTHER REFERENCES

Van der Stelt.: (1965) article abstracted in *Chemical Abstracts*, vol. 63, cols. 5585–7 (1965).

JOHN M. FORD, Primary Examiner

U.S. Cl. X.R.

260—999